No. 623,686. Patented Apr. 25, 1899.
H. S. PALMER.
MACHINE FOR MOLDING HOLLOW CONCRETE BUILDING BLOCKS.
(Application filed Feb. 26, 1898.)
(No Model.) 3 Sheets—Sheet 1.
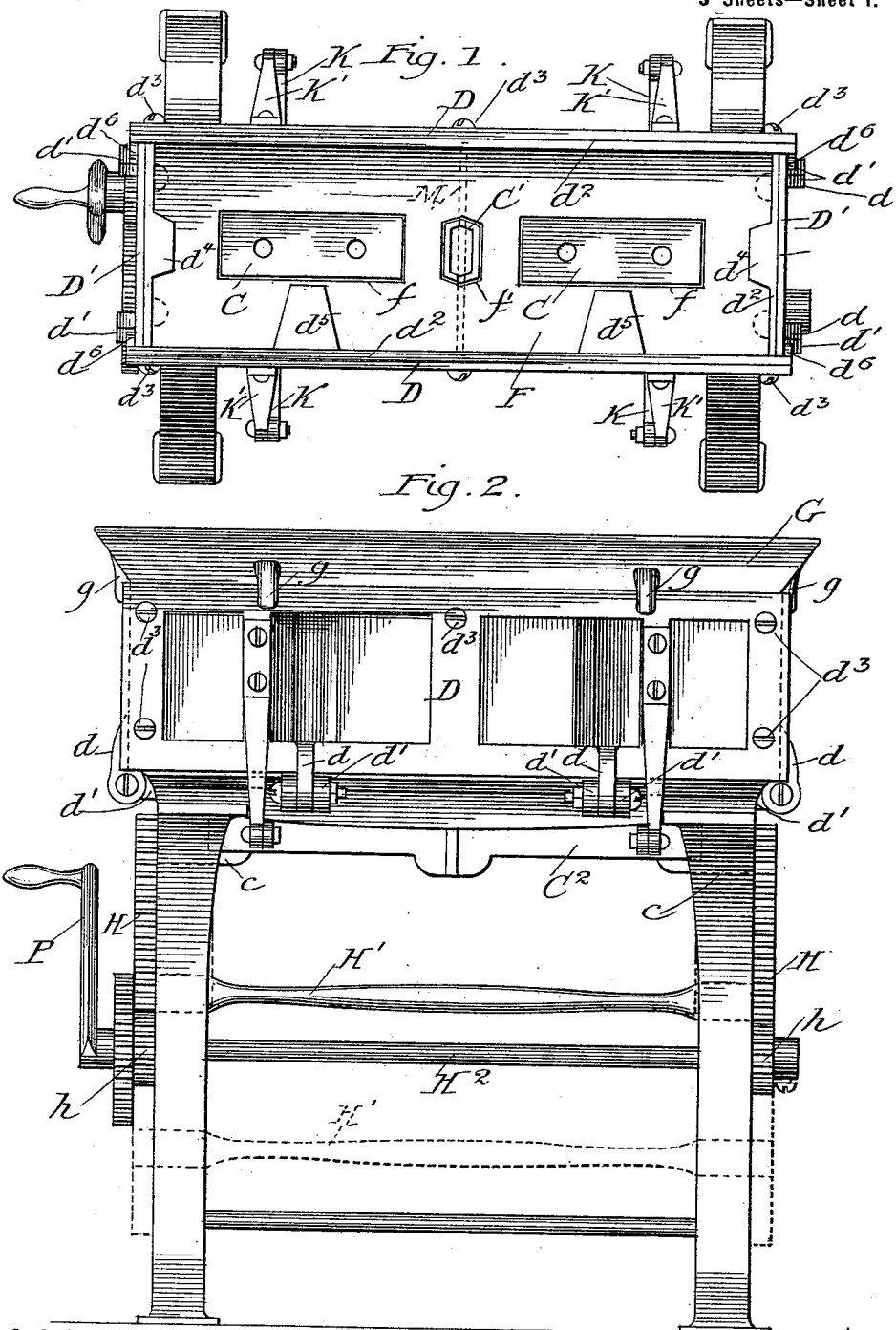

No. 623,686. Patented Apr. 25, 1899.
H. S. PALMER.
MACHINE FOR MOLDING HOLLOW CONCRETE BUILDING BLOCKS.
(Application filed Feb. 26, 1898.)
(No Model.) 3 Sheets—Sheet 2.
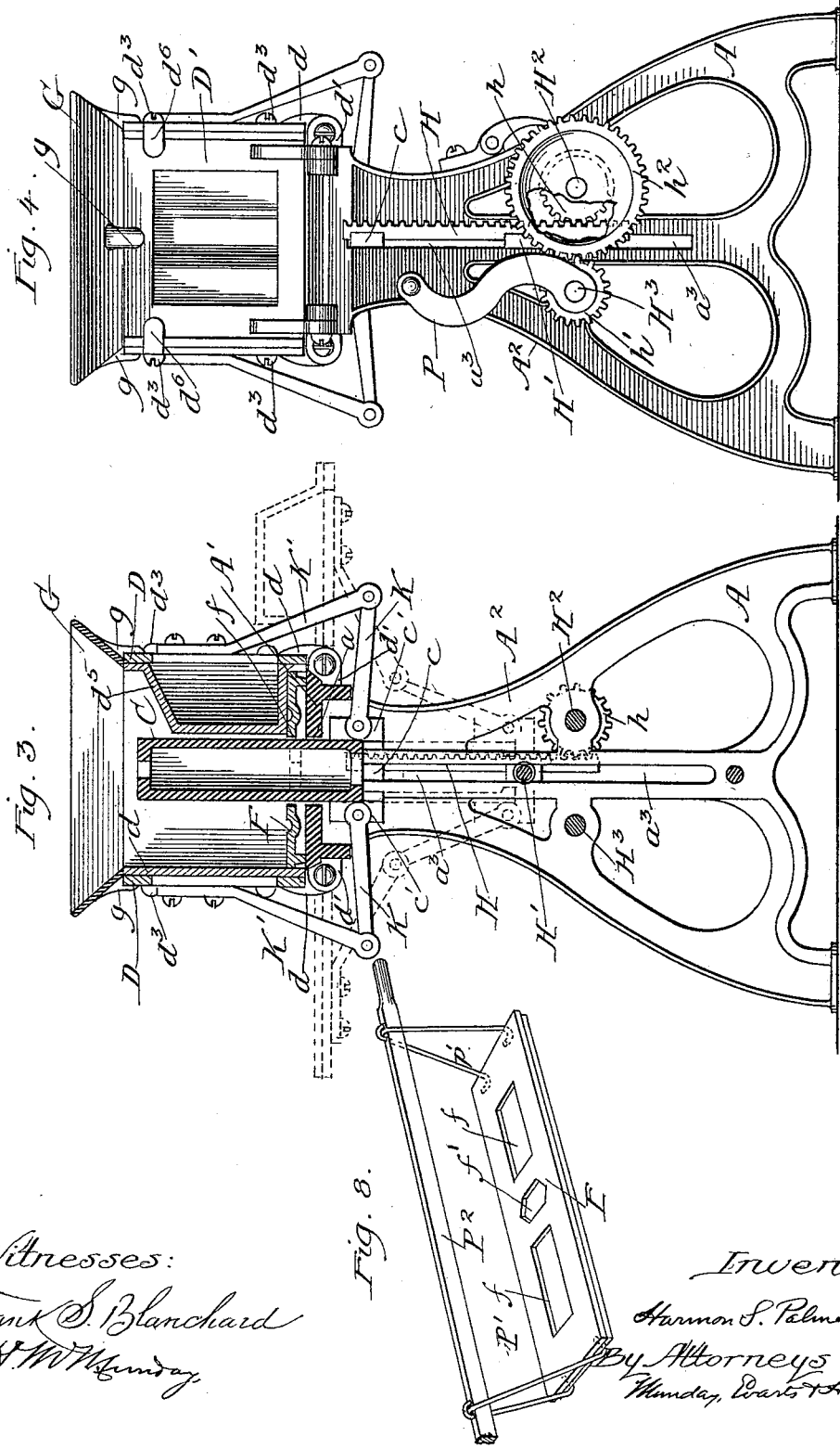
Witnesses:
Frank S. Blanchard
H. W. Munday
Inventor
Harmon S. Palmer
By Attorneys
Munday, Evarts & Adcock No. 623,686. Patented Apr. 25, 1899.
H. S. PALMER.
MACHINE FOR MOLDING HOLLOW CONCRETE BUILDING BLOCKS.
(Application filed Feb. 26, 1898.)
(No Model.) 3 Sheets—Sheet 3.
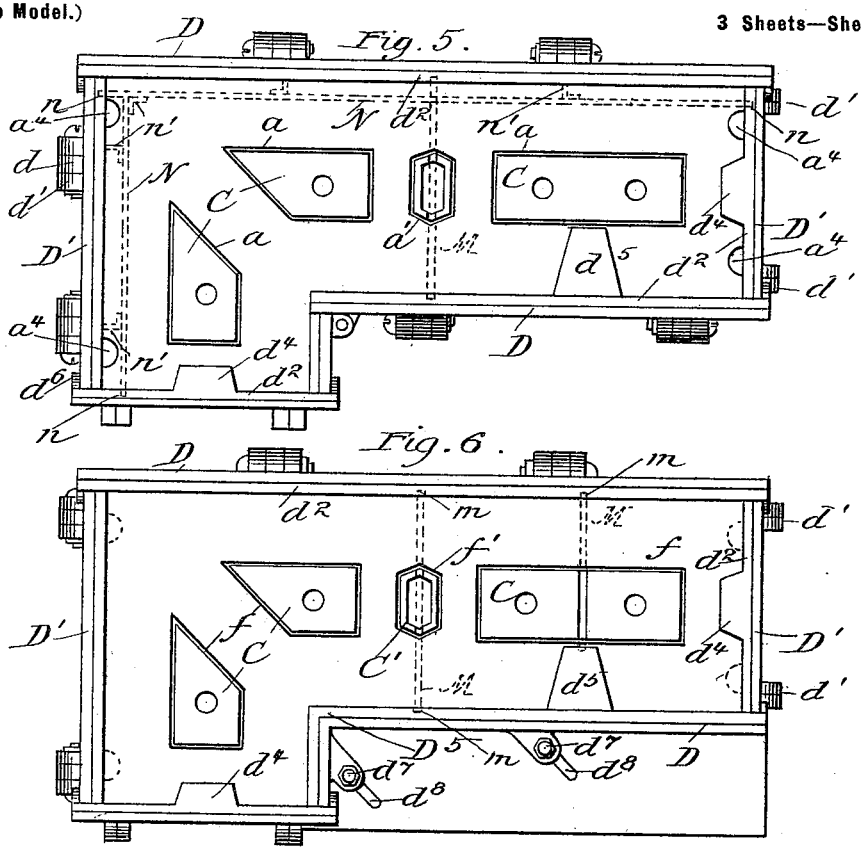
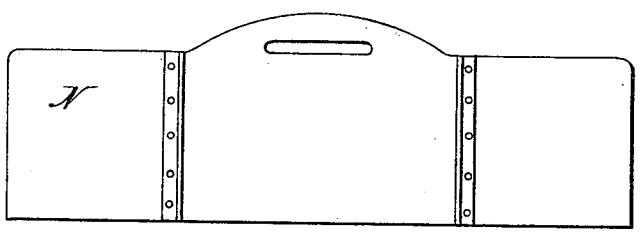
Witnesses:
Frank S. Blanchard
H. M. Munday,
Harmon S. Palmer
Inventor:
By Attorneys
Munday, Evarts & Adcock.

UNITED STATES PATENT OFFICE.

HARMON S. PALMER, OF CHICAGO, ILLINOIS.

MACHINE FOR MOLDING HOLLOW CONCRETE BUILDING-BLOCKS.

SPECIFICATION forming part of Letters Patent No. 623,686, dated April 25, 1899.

Application filed February 26, 1898. Serial No. 671,854. (No model.)

*To all whom it may concern:*

Be it known that I, HARMON S. PALMER, a citizen of the United States, residing in Chicago, in the county of Cook and State of Illinois, have invented a new and useful Improvement in Machines for Molding Hollow Concrete Building-Blocks, of which the following is a specification.

My invention relates to machines for molding concrete building-blocks, and more particularly to improvements upon the machine heretofore patented to me in Letters Patent of the United States No. 375,377, of December 27, 1887.

The object of my invention is to provide a machine of a simple, durable, and efficient construction by means of which hollow concrete building-blocks may be perfectly, rapidly, and cheaply manufactured and by means of which different kinds of blocks, in composition as well as design, may be readily formed by the same machine.

A further object is to simplify the operation and cheapen the construction of the machine heretofore patented to me and to provide a machine by which two or more building-blocks may be simultaneously formed.

In the practical manufacture of concrete or other building-blocks formed in part of cement the fresh blocks after being formed by the shaping or molding mechanism are exceedingly frail and liable to crack or crumble and remain in this condition for some time, or until the cement becomes partially set or hardened. One practical difficulty in the manufacture therefore is to release the fresh block after it is formed from the mold or shaping devices and remove it from the machine to a place where it may remain until the cement sets and hardens without cracking or injuring the block. This important result I secure in my new machine by combining the movable sides and end pieces of the mold or shaping device with the movable tapering core of the mold and connecting mechanism for removing and opening the sides and withdrawing the tapering core, so that the tapering core is necessarily always slightly withdrawn from the freshly-formed block before the movable sides are withdrawn or opened, whereby the fresh and frail block is supported on all sides by the movable sides of the mold until after the core is loosened from the block. By this means the withdrawal of the core from the concrete or cement material, which is always firmly tamped in the mold around the core, is effectually prevented from cracking or injuring the freshly-formed blocks.

To facilitate the removal of the freshly-formed block from the machine after the movable parts of the mold—its movable sides and ends and movable core—are withdrawn or released from the block, I provide the bed-plate of the machine, upon which the movable bottom plate of the mold rests, with notches or openings to enable suitable lifting devices, tongues, or hooks to engage the movable bottom plate for lifting and carrying it and the freshly-formed block or blocks resting thereon out of the machine, and thus be handled without danger of marring or breaking the block.

To further insure the proper withdrawal of the tapering core from the freshly-formed block without danger of injury thereto, I connect the cross-head carrying said core at each end to vertically-moving operating devices or racks, so that the force exerted upon the core to withdraw it can produce no tilting or binding action of the core in the block from which it is to be withdrawn.

In my invention the movable sides of the mold and the movable core are withdrawn by one operation, both being connected to the same operating mechanism. The operation of the machine is greatly facilitated and its capacity correspondingly increased, as the operator does not have to independently open and close the several different movable sides and the core.

To further increase the capacity of the machine, I combine with a single removable bottom plate and a single set of movable sides and ends two or more cores, which reciprocate up and down through suitable openings in the bed-plate of the machine and the removable bottom plate of the mold and are connected to a single core-block or cross-head, the same being preferably cast integral therewith and the mold being provided with one or more transverse division-plates to separate or divide from each other the two or more blocks which are simultaneously formed by the machine. To enable the outer face or one or more faces of the building-block to be composed of a different material and finer or more expensive material from that in its main body, I provide the mold with one or more face division-plates, which may be gradually raised or slipped upward as the mold is gradually filled with the concrete of different compositions on each side of the longitudinal or face division-plate.

To enable me to produce by the same machine building-blocks having different face designs, I provide one or more of the movable sides of the mold with a supplemental face-plate, which may bear the design and which may be removed from the main side and replaced by another.

To enable the same machine to be used for forming building-blocks specially constructed for the joist course of the building and to receive the ends of the joist, I provide the supplemental side plate with core-blocks, preferably formed integral therewith, the said core-blocks being made tapering or wedging, so that when the movable side carrying the same is opened or removed the fresh concrete block will not be broken or injured.

To further facilitate the operation of the machine, I provide the same with a removable hopper provided with lugs or devices for engaging the movable sides and ends of the mold and locking the same closed. This movable hopper also prevents any strain, due to the tamping operation upon the concrete in the mold, against the mechanism for operating the movable sides and ends of the mold and holding the same closed.

My invention also consists in the novel construction of parts and devices and in the novel combinations of parts and devices herein shown and described, and more particularly specified in the claims.

In the accompanying drawings, forming a part of this specification, Figure 1 is a plan view of a machine embodying my invention. Fig. 2 is a side elevation. Fig. 3 is a cross-section taken through one of the cores. Fig. 4 is an end view. Fig. 5 is a plan view of the machine, showing the face division-plates in place in dotted lines for forming blocks of different compositions in the face portion and body portion of the block. In this view the machine is shown of the form employed for forming corner-blocks for buildings. Fig. 6 is a plan view similar to Fig. 5, showing the face division-plates removed. Fig. 7 is a detail side view of the parting or division plate, and Fig. 8 is a view of the lifting-hook by which the removable bottom plate of the mold and the freshly-formed concrete blocks thereon are removed from the machine.

In the drawings, A represents the frame of the machine, the same being of any suitable construction adapted to give support and bearing to the operative parts of the machine.

A' is the bed-plate, the same being provided with two or more longitudinal openings $a\ a$, one for each of the cores C, and also with one or more polygonal openings $a'$ for the divisional core C', which forms in part the end meeting faces of the two or more building-blocks simultaneously formed by the machine.

D D are the movable side plates, and D' D' are the movable end plates of the mold.

F is the removable bottom plate of the mold, the same resting on the bed-plate A' and being provided with two or more rectangular openings $f\ f$ for the cores C C, corresponding to the openings $a\ a$ in the bed-plate A', and one or more openings $f'$, corresponding in shape to and registering with the opening $a'$ in the bed-plate A', for the divisional core C' to project through.

G is the removable hopper, the same being provided with lugs or projections $g$, adapted to fit over or embrace the upper edges of the movable sides D D and ends D' D' of the mold.

The vertical reciprocating cores C C and C' are each and all made slightly tapering or wedging to facilitate their withdrawal from the freshly-formed concrete block without danger of cracking or injuring the same and to cause the cores to become loose in the freshly-formed block as soon as they are very slightly withdrawn, so that so soon as this function is performed of loosening the cores in the blocks the movable sides and ends may then be opened and withdrawn or released from the block. The several cores C C C', whatever their number, are all simultaneously operated, and for this purpose are all secured to a single reciprocating block or cross-head $C^2$, which is preferably cast integral with the cores C C C'. This core-block or cross-head $C^2$ is provided at each end with projecting ends, lugs, or guides $c$, which reciprocate up and down in suitable guideways or slots $a^3$, which may be preferably formed in the legs $A^2$ of the frame. The reciprocating block or cross-head $C^2$ may be moved up and down, as required, to withdraw the cores from the mold and to project the same again up into the mold by any suitable mechanism connected to the cross-head at each end to insure the cores being withdrawn in straight lines and without any tipping or binding action against the freshly-formed block or mass of concrete tamped around the cores. I, however, prefer to employ for this purpose the mechanism illustrated in the drawings, consisting of a pair of racks H H, connected at their upper ends to the cross-head $C^2$ and connected together at their lower ends by a cross-bar H', and which mesh with gears $h\ h$ on a shaft $H^2$, journaled on the frame of the machine. The shaft $H^2$ is operated from the crank P on the shaft $H^3$ by a gear $h'$ on the crank-shaft, which meshes with a gear $h^2$ on the shaft $H^2$.

The movable sides D D and ends D' D' of the mold are preferably opened or released from the block by a swinging movement, the same being each connected at their lower edges by hinges $d\ d'$ to the bed-plate A' of the machine.

The movable side plates D and end plates D' are each preferably provided with a removable or detachable face-plate $d^2$, secured thereto by screws $d^3$, so that it can be readily removed and replaced by others when it is desired to give a different design or configuration to any of the sides or ends of the block. The end plates D' D' or the removable or detachable face-plates $d^2$ $d^2$, secured thereto, are provided with tapering polygonal-shaped cores $d^4$ $d^4$, corresponding each to one-half of the parting-core C', for the purpose of forming the vertical recess or cavity in the end of the block, as will be readily understood from Fig. 1 of the drawings. One of the movable sides D of the mold or the removable or detachable face-plate $d^2$, secured thereto, is provided with tapering or wedging cores $d^5$ to form the recesses in the sides of the block for receiving the ends of the joists when the machine is being used for forming the joist or belt course of blocks for a building.

The movable sides D D of the mold are preferably automatically opened and closed by connecting the same with the reciprocating core-block or cross-head $C^2$, by which the cores are operated. This may be done by any suitable connecting mechanism adapted to permit a slight downward movement of the core-block $C^2$ before the movable sides begin to be opened or withdrawn, so that the cores will be loosened from the freshly-formed block before the pressure of the movable sides on the block is relieved. I, however, prefer to employ for this purpose the mechanism illustrated in the drawings, as it is very simple and efficient, the same consisting simply in connecting-links K K, pivoted at one end to lugs or projections $c'$ on the cross-head $C^2$ and at their opposite ends to arms or brackets K' K', which are attached to the movable sides D D. When the core-block or cross-head $C^2$ is in its uppermost position, as illustrated in Fig. 3, the inner ends of the pivoted links K K are slightly above their outer ends, so that the cross-head $C^2$ may move downward a slight distance before the links K K begin to swing open the sides D D on their hinges. The looseness of the joints or the spring of the arms or brackets K' K' will readily permit this.

The movable sides D D are provided with lugs or projections $d^6$ $d^6$, that fit over and engage the movable ends D' D' to hold the same closed. The opening of the movable sides thus also simultaneously releases the movable ends.

If preferred, the movable ends may be automatically opened and closed by similar connecting mechanism to that employed for automatically opening and closing the movable sides by movement of the core-block or cross-head $C^2$.

In order to form two or more building-blocks simultaneously in the machine and on the same removable bottom plate F, I combine with this single bottom plate and the series or multiplicity of cores and the side and end plates one or more transverse or division plates M, inserted in slots $m$, provided for this purpose in the cores C or C' and side plates D D, as is also clearly shown in Figs. 1, 5, and 6. Heretofore machines for making concrete building-blocks made only a single block at a time, the same extending the full length of the machine. These transverse or division plates are thus of great value and small expense in the machine or in this combination.

N represents a face or longitudinal parting plate, the same being held in position by slots $n$ $n$ and ribs $n'$. These face or parting plates N N are designed to adapt the machine to produce building-blocks of different compositions, qualities, kinds or colors of concrete, or other material in the face and body portions of the block. Thus a face of the desired thickness can be put on the front, while the back can be of a cheaper mixture. These face parting-plates N N are gradually raised in the mold as the filling and tamping proceed, and when the mold is full they are entirely removed.

In Fig. 5 I have illustrated in plan view my machine as arranged for forming one corner-block simultaneously with a plain or ordinary block. The principle and mode of operation, however, are the same as before described.

In Fig. 6 the angle-plate $D^5$ of the mold is adapted to be withdrawn or released from the building-block or concrete by a sliding movement in a diagonal direction instead of by a swinging movement, this being effected by providing the angle side $D^5$ with bolts $d^7$, that slide in the angular slots $d^8$.

$P^2$ represents a lifting device for carrying the removable bottom plate F with the freshly-formed concrete blocks thereon out of and away from the machine. This device consists, preferably, of a handle-bar of wood or other suitable material, the length of which is nearly double that of the plate to be lifted off, and depending from this at either end are a pair of hooks P', hinged loosely to said handle-bar and so adapted to enter the recesses or spaces in the bed-plate A' and engage with the under side of the removable bottom plate F, on which the concrete blocks are made. The distance apart of these hooks on the handle-bar is such that when the plate and blocks are lifted off from the machine these hooks stand at an angle, the top of the hooks being farther apart than the lower ends, where they engage with the plate. The object of this is to protect the newly-made block from injury by coming in contact with the hooks while being carried away. The hooks P' fit in notches or recesses $a^4$, formed in the bed-plate A', and are thus enabled to catch under the bottom plate F.

The operation of my improved machine is as follows: In order to mold a building-block, the bottom plate is first placed on the bed-plate, the end leaves are turned up, which by the gravity of the plate, owing to the positions of the hinges, remain in that position, and the crank is then turned so as to raise the cores in the center of the mold until the upper end of said core is on a level with the upper edges of the sides and ends of the mold. It will be seen that as the cores rise by the rotating pinions the action of the connection rods or links K forces the hinged sides to their upright and proper position. Then the hopper is put on the top and crowded down, which firmly holds the sides and ends of the mold together. Concrete or other suitable material in its proper consistency is then put into the mold and firmly tamped therein. The hopper is then removed and the top of the block troweled or smoothed off. The crank is then turned so as to rotate the pinions in the direction necessary to draw the core down out of the block. By the connecting-rod being at this time in a nearly-horizontal position the core must necessarily move a little distance before its movement takes effect on the hinged sides to release them. Thus the core, being smaller at the top, is entirely loose in the block before the hinged sides are separated from it. This prevents the moving core from cracking or otherwise injuring the newly-made block. By this improvement much time and labor are saved over the old method of loosening and removing nuts and bolts necessary to remove the block from the machine. When the core and leaves are all down in a horizontal position, the handle-bar containing the hooks is adjusted over the newly-made block and the hooks made to enter the semicircular depressions $a^4$ in the bed-plate, which will thus engage the under side of the bottom plate containing the building-block, when it is easily raised from the machine and carried away. Another bottom plate is then put on the machine and the operation repeated to make another block. It will be seen that this handle and hooks are particularly adapted to handle the newly-made block. The hooks being hinged to the handle and wider at the top allows the block to swing without coming in contact with the hooks while being carried away.

I claim—

1. In a machine for forming hollow concrete building-blocks, the combination with a mold having movable sides, a reciprocating tapering core, and mechanism for operating the movable core and sides to withdraw or release the same from the formed building-block, said mechanism operating to slightly withdraw the core before releasing or withdrawing the sides, substantially as specified.

2. In a machine for forming concrete building-blocks, the combination with a mold having movable sides and ends, a reciprocating core, a removable bottom plate having an opening for the core, and mechanism connecting and operating the core and movable sides, substantially as specified.

3. The combination with the bed-plate, movable sides and ends, removable bottom plate, a reciprocating core and a removable hopper having lugs or projections engaging the sides of the mold, substantially as specified.

4. The combination with a bed-plate, of sides and ends hinged thereto, a removable bottom plate, and a hopper engaging the sides and ends, substantially as specified.

5. In a machine for forming concrete building-blocks, the combination with a bed-plate, removable bottom plate, movable sides and ends, two or more reciprocating tapering cores passing through the bed-plate and bottom plate, a transverse division-plate for simultaneously forming a multiplicity of blocks, and mechanism connecting and operating the movable cores and sides, substantially as specified.

6. In a machine for forming building-blocks, the combination with a mold having removable sides and ends, and a removable bottom plate, of two or more cores, and an intermediate parting or division core, and a transverse division-plate, substantially as specified.

7. The combination with a mold having movable sides and ends, two or more reciprocating tapering cores, an intermediate parting or division core, the ends of the mold being provided with core-blocks, and a transverse division-plate, substantially as specified.

8. In a machine for molding concrete building-blocks, the combination of a mold, a core-carrying cross-head, cores carried by the cross-head, racks on said cross-head, shafts $H^2 H^3$, gears connecting said shafts, and gears on one of said shafts meshing with said racks, crank P, racks at both ends of the machine, and gears meshing with said racks, substantially as specified.

9. In a machine for molding hollow concrete building-blocks, the combination of a bed-plate and removable bottom plate, of a mold provided with hinged sides, a reciprocating cross-head, a core-block carried thereby, connecting-links K K, projecting arms K' K', whereby the hinged sides are operated or controlled by the cross-head, substantially as specified.

10. In a machine for molding concrete building-blocks, the combination of a bed-plate having notches or recesses therein, of a removable bottom plate, a mold having movable sides and ends and lifting-hooks adapted to engage the removable bottom plate, without touching the freshly-formed building-blocks resting thereon after the movable sides and ends are opened or released therefrom, to remove the freshly-formed building-block from the machine without injury or marring, substantially as specified.

11. In a machine for molding hollow concrete building-blocks, the combination with a bed-plate, of a removable bottom plate, a mold having movable sides and ends, two or more movable cores reciprocating through openings in the bed-plate, a removable transverse division-plate, said movable sides being provided with vertical slots to receive the division-plate, substantially as specified.

12. In a machine for molding hollow concrete building-blocks, the combination with a bed-plate, of a removable bottom plate, a mold having movable sides and ends, a movable core reciprocating through openings in the bed-plate and bottom plate, and a rectangular flaring hopper having a mouth corresponding in size to the mold and provided with lugs fitting over and engaging the upper edge of the mold, substantially as specified.

13. In a machine for molding concrete building-blocks, the combination with the bed-plate, a movable bottom plate and the mold having hinged sides, of a movable core and the beveled projections on the hinged sides, extending through to the core, or their equivalents, for the purpose substantially as specified.

14. In a machine for molding hollow concrete building-blocks, the combination with the bed-plate, a movable bottom plate and the mold having hinged sides, of a movable core and removable face-plates, all substantially as specified.

15. In a machine for molding hollow concrete building-blocks, the combination with a mold having hinged leaves, of the wedge-shaped core, the connecting-rod and projecting bar or equivalents, and mechanism for operating the core and leaves by which the core is loose before the leaves begin to fall, substantially as specified.

HARMON S. PALMER.

Witnesses:
H. M. MUNDAY,
LEW. E. CURTIS.